Aug. 22, 1961     A. L. HEFFELFINGER     2,996,733
FORMED PAD
Filed Dec. 17, 1958
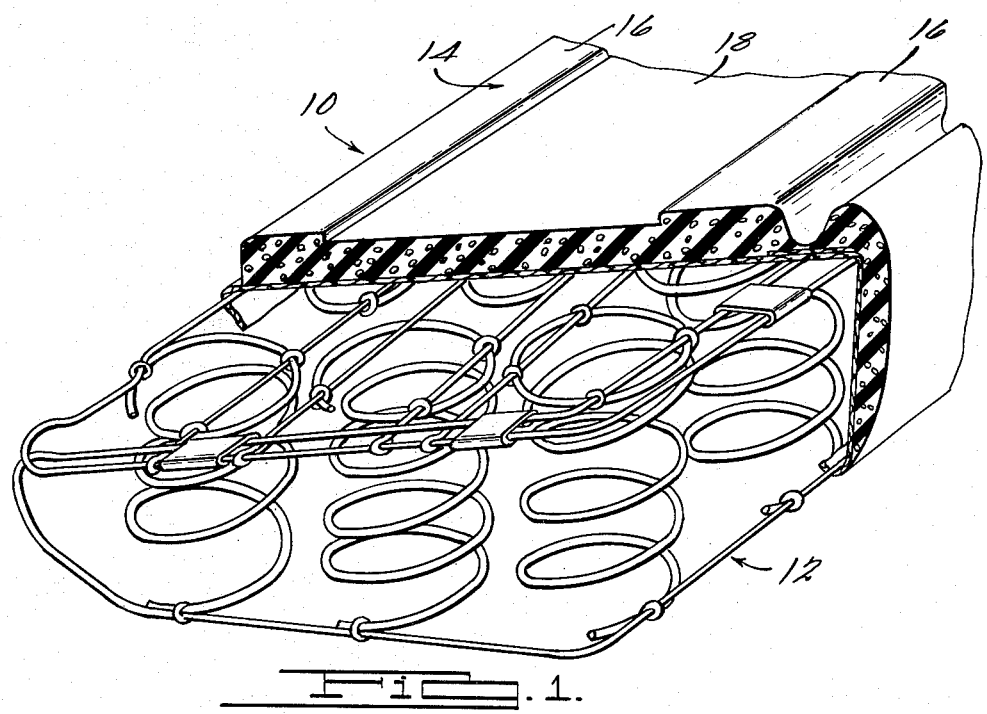
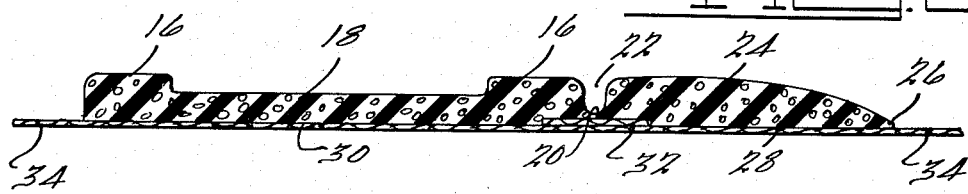
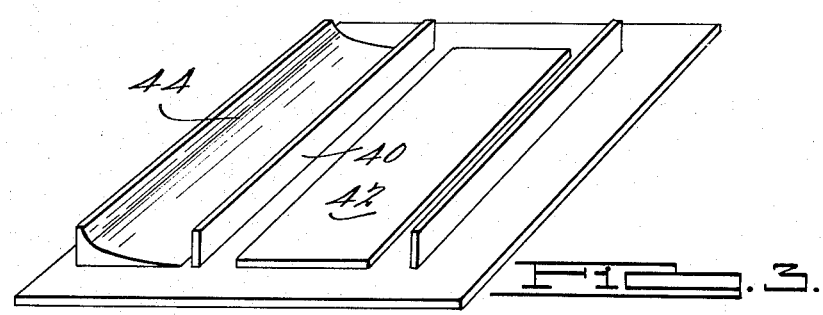
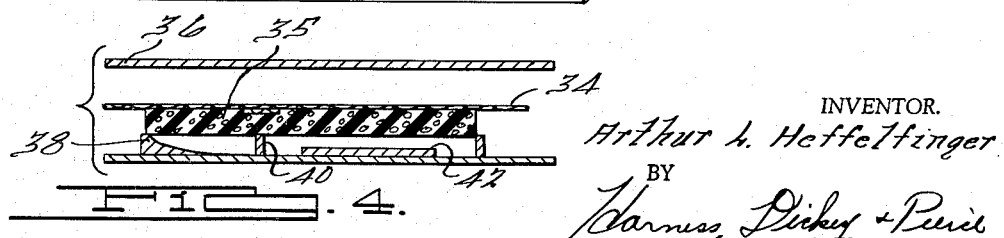
INVENTOR.
Arthur L. Heffelfinger
BY
Harness, Dickey & Pierce
ATTORNEYS.

2,996,733
FORMED PAD
Arthur L. Heffelfinger, Fort Madison, Iowa, assignor to Sheller Manufacturing Corporation, Detroit, Mich., a corporation of Indiana
Filed Dec. 17, 1958, Ser. No. 781,088
5 Claims. (Cl. 5—354)

This invention relates generally to contour molded articles formed of cellular material and more particularly to a fabric backed contour molded pad having very dense and thin sections to which a cover can be sewed or otherwise secured to obtain a desired fabric appearance and which has particular utility in vehicle seat assemblies.

The formed pad of this invention is useful as a topper pad which is placed on the springs in a vehicle seat assembly and is then covered with the usual seat upholstery material. The pad is formed of a cellular spongy material and functions either by itself, or with a sub-pad as the seat padding. Most topper pads have heretofore been formed of a latex foam material and were molded when the foam material was in a fluid condition. Consequently, all parts of the pad were of substantially the same density. This requires a minimum pad thickness at all points for strength purposes. Also, there is no variable in such a pad for varying the resilience of different parts of the pad. As a result, such a pad cannot readily be adapted to the requirements of modern automobiles. The pad of this invention is, of course, also useful in furniture seating and is installed in substantially the same manner. A ribbed type pad is also useful, in large sizes, as a divider curtain or backdrop drape.

It is an object of this invention, therefore, to provide an improved formed pad.

A further object of this invention is to provide a foam pad of the above type which has high and low density areas.

Still a further object of this invention is to provide a foam pad which is made by heating and compressing parts of a sheet of flexible polyurethane foam so as to contour form the sheet to the desired shape.

Further objects, features and advantages of this invention will become apparent from a consideration of the following description, the appended claims, and the accompanying drawing in which:

FIGURE 1 is a fragmentary perspective view of an illustrative form of the pad of this invention shown in assembly relation with a spring for an automobile seat;

FIG. 2 is a transverse sectional view of the pad of this invention;

FIG. 3 is a perspective view of part of the mold used to contour form the pad of this invention; and FIG. 4 is a sectional view of the mold parts and the foam sheet prior to movement of the parts together to contour form the sheet therebetween.

With reference to the drawing, the formed pad of this invention is illustrated in the form of a topper pad, indicated generally at 10, applied to a spring assembly 12 for an automobile seat. The topper pad 10 is illustrated as consisting of a body 14 of foam material, preferably polyurethane foam, which can be permanently deformed under heat and pressure. As shown in FIGS. 1 and 2, the body 14 has a pair of relatively narrow, longitudinally extending sections 16 arranged on opposite sides of a section 18 of reduced thickness relative to the sections 16. Adjacent the inner one of the sections 16 the topper pad is formed with a groove 22 so that the section 20 of the pad opposite the groove 22 is very thin and is of a high density. The section 20 is of such a high density that it has practically no resilience and is in substantially a solid form. This section 20 is the most dense part of the topper pad 10 and is also the thinnest part of the pad. Adjacent the section 20, the body 14 is formed with an end seciton 24 which is of a progressively decreasing thickness in a direction toward the edge 26 of the body 14 which is hereinafter referred to as the front edge of the body.

In order to strengthen and facilitate mounting of the body 14, a cloth sheet 28, formed preferably of burlap, is secured to the bottom surface 30 of the body 14. A reinforcing strip 32 of a similar cloth material is disposed between the sheet 28 and the section 20 for reinforcing the section 20. However, if the loads on the section 20 will not be high, the strip 32 may be omitted and in pads which have many dense sections 20 to create a particular design, such as a honeycomb, the reinforcing strips are omitted. As shown in FIG. 2, the sheet 28 has edge sections 34 which extend beyond the opposite edges of the body 14 for a purpose to appear presently.

In forming the body 14, a sheet of foam material of the type which will be permanently deformed under heat and presusre and has low flow characteristics so that a thin section has a high density, is disposed between a pair of relatively movable mold parts 36 and 38 as illustrated in FIG. 4. One or both of the mold parts 36 and 38 are heated and the mold parts are moved together so as to compress the foam sheet 35 therebetween. As shown in FIGS. 3 and 4, the lower mold part 38 has plates 40 and 42 secured to its upper surface so that they constitute upward projections. These plates 40 and 42 are located at positions corresponding to the desired locations in the body 14 of the sections 20 and 18. The plates 40 and 42 are of a shape to provide for the necessary compression of the sheet 35 to the thickness illustrated for the sections 20 and 18, respectively. The lower mold part 38 is also formed with a fillet section 44 which cooperates with the upper plate 36 to form the progressively decreasing thickness section 24 of the body member 14. The burlap sheet 28 is secured to the body 14 by arranging the sheet of cloth between the foam sheet 35 and the mold plate 36 which is not heated to a temperature high enough to burn the burlap sheet. The foam material is then compressed and flowed into the cloth sheet so that the foam and cloth are mechanically locked together.

This thickness of the stock sheet 35 used to form the body 14, will, of course, determine the density of the different sections of the body 14. For any given sheet thickness, there is a minimum mold temperature that will produce adequate permanent deformation of the sheet. The state of cure of the foam is not a limiting factor in this process but an intermediate state of cure facilitates the forming since the mold heat then provides for a final cure of the foam.

In the assembly of the topper pad 10 with the springs 12, pad 14 is positioned on the top side of the springs 12 as shown in FIG. 1 so that the section 18 will support the seat of an individual sitting on the seat assembly formed by the springs 12 and the topper pad 10. The density of the section 18 is such that it provides the resistance necessary to provide for a firm seat support. The intermediate section 16 is located so that the individual's legs extend transversely across the section 16 and are supported to some extent thereon. Since this support presents very little weight on the section 16, it is formed of an increased thickness relative to the section 18 for providing the desired resilience. The section 20, which is of a very high density compared to the other sections of the pad 10 and is thus very tough and resistant to tearing, is conveniently attached by sewing, metal rings, or the like to the spring assembly 12. The section 24 is of a shape such that it provides for a desired shape at the front side of the seat assembly. The projecting burlap end portions 34 are readily connected by metal rings to the edges of the spring assembly 12 to provide for a ready connection of the topper pad 10 to the springs From the above description it is seen that this invention provides a topper pad whch is permanently deformed by heat and pressure to a final shape in which it has portions having different resilience and density characteristics. As a result, it readily fulfills the requirements for a comforatable and easily mounted seat padding.

It will be understood that the specific construction of the improved topper pad which is herein disclosed and described is presented for purposes of explanation and illustration and is not intended to indicate limits of the invention, the scope of which is defined by the following claims.

What is claimed is:

1. A formed pad adapted for attachment to a spring structure which comprises a unitary body formed from a foam material which is permanently deformable by the application of heat and pressure, said body having a substantially flat bottom surface and having a resilient foam seat support portion, a resilient foam leg support portion directly connected to said seat support portion, and having a greater thickness than said seat support portion, a resilient foam end portion connected to said leg support portion by a reduced thickness portion disposed therebetween and integral therewith, and a single backing member bonded to the bottom surface of each of said portions.

2. A formed pad adapted for attachment to a spring structure which comprises a unitary body formed of a foam material adapted to be permanently deformed under heat and pressure, one surface of said body being substantially planar and having bonded thereto a single backing member, the opposite surface of said body being contoured so as to form a resilient foam seat support portion, a resilient foam leg support portion having a greater thickness than said seat support portion and adjacent thereto, a resilient foam end portion having a gradually decreasing thickness in the direction away from said leg support portion and said end portion being connected to said leg support portion by a reduced thickness portion disposed therebetween and integral with both said leg portion and said end support portion, said reduced thickness portion having sufficient strength to enable secure attachment of the said foam pad to said spring structure.

3. A unitary topper pad comprising a body formed of a polyurethane foam material, said body having a substantially flat bottom surface and having a resilient foam seat support portion, a resilient foam leg support portion directly connected to said seat support portion and having a greater thickness than said seat support portion, a resilient foam end portion connected to said leg support portion by a reduced thickness portion disposed therebetween and integral therewith, and a single backing member bonded to the bottom surface of each of said portions.

4. A topper pad in accordance with claim 3 wherein a cloth reinforcing member is interposed between said backing member and said reduced thickness portion.

5. A foam pad covered spring structure comprising a plurality of coil springs connected by a plurality of upper edge wire members attached to the upper ends of said coil springs and a plurality of lower edge wire members connected to the lower ends of said coil springs and a unitary topper pad attached to at least one of said upper edge wire members, said topper pad comprising a unitary body of a polyurethane foam material, said body having a substantially flat bottom surface and having a resilient foam seat support portion, a leg support portion directly connected to said seat support portion and having a greater thickness than said seat support portion, a resilient foam end portion connected to said leg support portion by a reduced thickness portion disposed therebetween and integral therewith, and a single backing member bonded to the bottom surface of each of said portions, said topper pad being connected to said spring structure at said reduced thickness portion.

References Cited in the file of this patent

UNITED STATES PATENTS

| | | |
|---|---|---|
| 2,221,507 | Clark | Nov. 12, 1940 |
| 2,308,964 | Saurer | Jan. 19, 1943 |
| 2,783,827 | Neely | Mar. 5, 1957 |
| 2,835,906 | Robbins | May 27, 1958 |
| 2,867,222 | Otto et al. | Jan. 6, 1959 |
| 2,878,153 | Hacklander | Mar. 17, 1959 |